(12) United States Patent
Blythe

(10) Patent No.: US 8,359,268 B2
(45) Date of Patent: Jan. 22, 2013

(54) SYSTEM AND METHOD FOR PROCESSING FINANCIAL TRANSACTIONS

(75) Inventor: Simon Blythe, Ely (GB)

(73) Assignee: MasterCard International Incorporated, Purchase, NY (US)

( * ) Notice: Subject to any disclaimer, the term of this patent is extended or adjusted under 35 U.S.C. 154(b) by 294 days.

(21) Appl. No.: 11/954,104

(22) Filed: Dec. 11, 2007

(65) Prior Publication Data

US 2009/0150235 A1 Jun. 11, 2009

(51) Int. Cl.
*G06Q 40/00* (2006.01)
(52) U.S. Cl. ......................................................... 705/40
(58) Field of Classification Search .................... 705/40
See application file for complete search history.

(56) References Cited

U.S. PATENT DOCUMENTS

| | | | |
|---|---|---|---|
| 5,466,919 A | 11/1995 | Hovakimian | |
| 5,864,822 A | 1/1999 | Baker, III | |
| 5,920,847 A * | 7/1999 | Kolling et al. | 705/40 |
| 6,581,041 B1 | 6/2003 | Canney | |
| 6,965,912 B2 | 11/2005 | Friedman et al. | |
| 7,069,438 B2 | 6/2006 | Balabine et al. | |
| 7,130,817 B2 | 10/2006 | Karas et al. | |
| 7,213,742 B1 * | 5/2007 | Birch et al. | 235/375 |
| 2002/0188533 A1 * | 12/2002 | Sanchez et al. | 705/30 |
| 2006/0073808 A1 * | 4/2006 | Buchert | 455/406 |
| 2007/0267479 A1 * | 11/2007 | Nix et al. | 235/379 |
| 2007/0278288 A1 | 12/2007 | Simmons | |
| 2007/0288372 A1 | 12/2007 | Behar et al. | |
| 2008/0103972 A1 * | 5/2008 | Lanc | 705/44 |

* cited by examiner

*Primary Examiner* — Lindsay M. Maguire
(74) *Attorney, Agent, or Firm* — Hoffmann & Baron, LLP

(57) ABSTRACT

A system for processing financial transactions based on consumer preferences is disclosed. The system allows a user to specify on a payment device a consumer preference which is communicable to a payment terminal and is determinative in pricing goods and services.

13 Claims, 3 Drawing Sheets

*← 32*

| USER PREFERENCES | | | | | |
|---|---|---|---|---|---|
| DEMOGRAPHIC INFORMATION *42* | | | LIFESTYLE INFORMATION *42* | | |
| | | PRIVACY | | | PRIVACY |
| | | | Exercise | YES | |
| Educational Level | 12 | * *40* | Importance of nutrition | HIGH | |
| Occupation | Scientist | | | | |
| Household income | $US 50,000 | * *40* | Food Safety | HIGH | |
| | | | Healthfulness | MEDIUM | |
| Age | 25 | | | | |
| Size of community | 100,000 | | Smoking | YES | |
| | | | DIETARY CONCERNS | | |
| *36* | *38* | | | | |
| PURCHASES | | | Cholesterol | YES | |
| ITEM | DATE | | | | |
| | | | Salt | NO | |
| 1. ACME Axle Grease | 11/10/2007 | | | | |
| | | | Sugar | NO | |
| 2. ACME Atom Re-Arranger | 11/09/2007 | | | | |
| 3. ACME Inc. ANVIL | 11/5/2007 | | Fiber | NO | |
| 4. ACME Anti-Nightmare Machine | 11/2/2007 | | | | |
| | | | Fat | YES | |
| *62* | *64* | | *46* | *48* | |

*60 ―*

| SAVE | QUIT |
|---|---|
| *50* | *52* |

FIG. 3

SYSTEM AND METHOD FOR PROCESSING FINANCIAL TRANSACTIONS

BACKGROUND OF THE INVENTION

1. Field of the Invention

The present invention generally relates to financial transaction systems, and more particularly to financial transaction systems that utilize personal profiles.

2. Brief Description of the Related Art

Transaction payment systems are prevalent throughout society. Instead of using cash, consumers are now using many different types of payment devices to buy a wide range of items. These payment devices can include credit, debit, prepaid and smart cards, as well as cellular phones, personal digital assistants (PDAs), and other types of devices.

For example, in some implementations, consumers use smart cards to make payments without having to manually swipe a card through a conventional point-of-sale device (i.e., a magnetic strip card reader). An exemplary smart card is the MasterCard PayPass® card. This card is an enhanced payment card that includes an embedded microprocessor chip and antennae (i.e., a miniature Radio Frequency (RF) transceiver chip and an antenna, or an active Radio Frequency Identification (RFID) tag).

Many consumers receive rewards for using payment devices, such as frequent flier points and gift certificates, as an incentive to use the devices. Typically, the rewards are earned subsequent to purchasing the item or service, which may or may not include balance transfers, cash advances, or other special uses. The rewards are typically not earned based on product or service preferences. Accordingly, an improved implementation that provides rewards based on consumer preferences is desired.

SUMMARY OF THE INVENTION

A system for processing financial transactions based on consumer preferences is disclosed. The system allows a user to specify on a payment device a consumer preference which is communicable to a payment terminal and is determinative in pricing goods and services.

Various aspect of the system relate to identifying consumer preferences and determining pricing for goods or services. For example, according to one aspect, a system for conducting a financial transaction includes a payment device capable of sending at least one personal preference and a financial transaction instruction for purchasing at least one of a good and service. The system also includes a payment terminal capable of (i) receiving the at least one personal preference and the financial instruction and (ii) processing the financial transaction instruction using the at least one personal preference.

Preferably, the personal preference is a user-defined parameter value. In one preferred embodiment, the user-defined parameter value is associated with at least one of demographic and lifestyle information.

Preferably, the system also includes a graphical user interface for selecting the at least one personal preference. In one preferred embodiment, the at least one personal preference is protected using a secure protocol. Preferably, sending the at least one personal preference is user configurable.

In one preferred embodiment, the payment terminal of the system adjusts a purchase price for the at least one good or service based on the at least one personal preference. The adjusted purchase price is preferably displayed on a display device of at least one of the payment terminal and the payment device.

In another preferred embodiment, the payment device stores a profile of the at least one good or service purchased. Preferably, the payment device transmits the profile to the payment terminal and the payment terminal adjusts a purchase price for the at least one good and service based on the profile. In one preferred embodiment, the at least one personal preference and financial transaction instruction are wirelessly transmitted to the payment terminal.

In yet another preferred embodiment, the system further includes the payment device transmitting wirelessly a profile to the payment terminal and the payment terminal adjusting a purchase price for the at least one good and service based on at least one of the profile and the personal preference.

In another aspect, a method for conducting a financial transaction includes providing a payment device capable of sending at least one personal preference and a financial transaction instruction for purchasing at least one of a good and service, and providing a payment terminal capable of (i) receiving the at least one personal preference and the financial instruction and (ii) processing the financial transaction instruction using the at least one personal preference.

Preferably, the method also can include associating at least one of demographic and lifestyle information with the personal preference. In one preferred embodiment, the method also includes providing a graphical user interface for selecting the at least one personal preference. Preferably, the method also includes protecting the at least one personal preference using a secure protocol.

In one preferred embodiment, sending the at least one personal preference to the payment terminal is user configurable. Preferably, the method also includes adjusting a purchase price for the at least one good or service based on the at least one personal preference. The method can also include displaying the adjusted purchase price on a display device of at least one of the payment terminal and the payment device.

In one preferred embodiment, the method includes storing a profile of the at least one good or service purchased on said payment device. The method can also include transmitting the profile to the payment terminal, and adjusting a purchase price for the at least one good and service based on the profile.

In another preferred embodiment, the method includes transmitting wirelessly the at least one personal preference and financial transaction instruction from the payment device to the payment terminal. The method can also include transmitting wirelessly a profile from the payment device to the payment terminal, and adjusting a purchase price for the at least one good and service based on at least one of the profile and the personal preference.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 3 is an example graphical user interface for defining a personal preference.

DETAILED DESCRIPTION OF THE PREFERRED EMBODIMENTS

Figure 1:
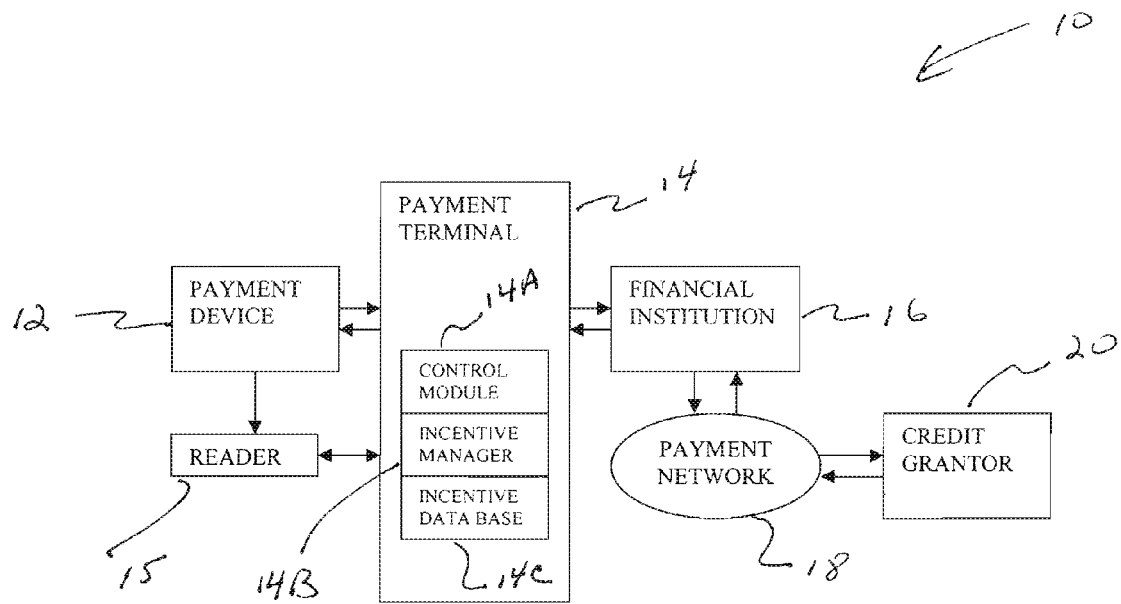
FIG. 1 is a block diagram of a financial transaction system according to the present invention.

FIG. 1 illustrates a financial transaction system 10 that can provide incentives and discounts for goods and services based on consumer preferences. The system can be used to affect consumer purchase decisions, motivate a consumer to aspire to a particular lifestyle, and promote product and service branding.

In one preferred embodiment, as shown in FIG. 1, the system 10 includes a payment device 12 capable of receiving and sending financial transaction information and personal preferences, a payment terminal 14 that may operate as a point of sale (POS) terminal for merchants, and a reader 15 for receiving personal preference information and transmitting the information to the payment terminal 14.

The payment device 12 shown in FIG. 1 can be any type of personal computer device, including but not limited to personal computers, such as laptop computers, handheld computers, mobile phones, personal digital assistants (PDAs), and/or any other device comprising electronic components, such as a smart card. Although only one payment device is shown in FIG. 1, the present invention is not limited to one payment device and can include a multitude of varied payment devices that are capable of communicating using various secure protocols.

The reader 15 is an electronic device that provides a path for the payment device 12 to send information stored therein. Preferably, the reader 15 includes an infrared IRDA port to send and receive messages from the payment device 12 to the payment terminal 14. In one preferred embodiment, the reader 15 is configured on a wall of the merchant's establishment and wirelessly communicates information from the payment device 12 to the payment terminal 14 upon the consumer swiping the payment device 12 on the reader 12. In another preferred embodiment, the reader 15 is coupled to the payment terminal 14 and transmits payment device 12 information upon swiping the device 12 on the reader 15. In yet another preferred embodiment, as shown in FIG. 1, the payment device 12 communicates information directly with the payment terminal 14.

The payment terminal 14 of the present invention is a computer device that operates as a point of sale terminal for goods or services rendered. As shown in FIG. 1, in one preferred embodiment, the payment terminal 14 includes a control module 14A for processing financial transaction instructions, an incentive manager 14B that adjusts the pricing of goods and services based on user preferences, and an incentive database 14C that stores available discounts, preferences and promotions offered by the merchant. Details of the control module 14A, incentive manager 14B and incentive database 14C are discussed in connection with FIG. 4 of the disclosure.

As shown in FIG. 1, the payment terminal 14 is preferably in communication with a financial institution 16, such as a bank, which has access to a conventional payment network 18 in which the merchant has a financial account. A credit grantor 20 is also preferably in communication with the payment network 18 and provides a particular level of credit to the payment device user.

Figure 2:
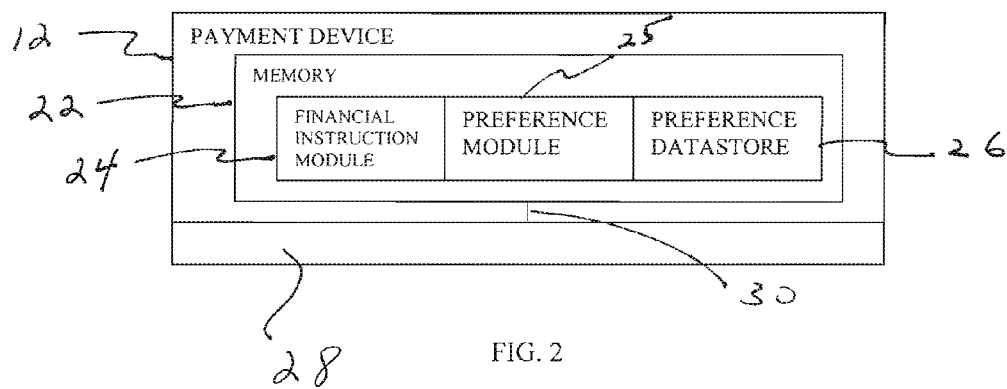
FIG. 2 is a block diagram of a payment device according to the present invention.

Referring now to FIG. 2, in one preferred embodiment, the payment device 12 is a smart card comprising a memory 22, an Input/Output (I/O) port 28 and a bus line 30 to connect the port 28 to the memory 22. As shown in the FIG. 2 example, in one preferred embodiment, the memory 22 of the device 12 is configured to include a financial instruction module 24, a preference module 25 and a preference datastore 26.

The financial instruction module 24 is used to provide programming instruction sets which are associated with, i.e., perform when interpreted and executed by the payment terminal 14, one or more financial transactions. In one preferred embodiment, the module 24 provides instructions to direct the payment terminal 14 regarding options (e.g., debit or credit card functionality) available to the user. Preferably, these options are pre-selected, meaning that the instructions associated with these options are pre-configured on the payment device 12 prior to use for a particular financial transaction.

The preference module 25 provides a graphical user interface that allows a user to select consumer preferences, lifestyle aspirations, group affiliations, and the like, and maintains a listing of goods and services purchased. Preferably, the preference module 30 displays a graphical user interface 32 and prompts the user to select user preferences. For example, in one preferred embodiment, upon attachment of the payment device 12 to a personal computer (PC), the preference module 25 provides the graphical user interface 32 on a display attached to the PC. In another preferred embodiment, the payment device 12 includes a display area (not shown) to display the graphical user interface 32. In yet another preferred embodiment, the preference module 30 displays goods and services purchased by the consumer over a period of time using the payment device 12. An example of the graphical user interface provided by the preference module 25 is discussed in connection with FIG. 3.

The preference datastore 26 provides storage for one or more selected user preferences, as well as data items representative of a user's identity, such as account number, card expiration information, and security codes. In one preferred embodiment, as shown in FIG. 1, contents of the datastore 26 are communicated to the reader 15 which then transmits the information to the payment terminal 14. In another preferred embodiment, contents of the datastore 26 are transmitted directly to the payment terminal 14 upon commencement of a financial transaction. Information maintained in the datastore 26 also can be altered (updated, added to, or reduced) via the port 28 allowing for modification of personal preferences.

Referring now to FIG. 3, an example graphical user interface 32 provided by the preference module 25 is shown. The graphical user interface 32 allows the user of the system to specify preferences. For example, as shown in FIG. 3, in one preferred embodiment, the graphical user interface 32 provides a set of demographic 36 and lifestyle preferences 46, each of which may be associated with values 38, 48 assigned by the user. As shown in FIG. 3, demographic information such as education level, occupation, household income, age, and community size may be entered and/or selected by the user. Similarly, consumer lifestyle preferences relating to exercise, food safety, smoking, and dietary concerns also can be entered and/or specified by the user. It will be appreciated by one skilled in the art, however, that although two sets of preferences are shown in FIG. 3, the present invention is not limited to two sets of preferences and can include any number of sets of preferences. In addition, it will be appreciated by one skilled in the art that the preferences shown in FIG. 3 are merely exemplary, and that various types of information can be provided by the preference module 25 through the interface 32 to gather user preferences.

As shown in FIG. 3, in one preferred embodiment, the graphical user interface 32 provides a privacy selection 42 that allows the user to specify for each demographic and lifestyle preference whether values 38, 48 associated with the same are to be transmitted to device readers or terminals. For example, as shown in the FIG. 3 example, by associating the symbol "*" 40 with education level and household income data values, the user can specify that these values are not to be automatically transmitted to the reader 15 or payment terminal 14 of the system.

In one preferred embodiment, the graphical user interface 32 also includes a listing of purchases 62 made using the payment device 12 with associated purchase dates 64. For example, as shown in the FIG. 3 example, the first item purchased with the payment device 12 is ACME Axle Grease on Nov. 10, 2007 and the last good purchased with the payment device 12 is an ACME Anti-Nightmare Machine on Nov. 2, 2007.

Once user preferences are selected and/or specified, upon selection of a save button 50, the preference module 25 stores data values and associated privacy selections 42 assigned by the user to the preference datastore 26. Selection of a quit button 52 causes the preference module 25 to exit the user interface 32.

Several advantages can stem from providing the graphical user interface 32 in the context of the present invention. By allowing users to specify personal preferences that represent particular lifestyle choices, the system can suggest and/or promote goods or services that meet those preferences. For example, a user specifying a preference for low fat foods and transmitting that information to the reader 15 or payment terminal 14, may be entitled to price discounts on certain food items that include low fat. Various food items having that characteristic can also be suggested to the user.

Various types of marketing and branding schemes may also be deployed using the current invention. For example, a merchant can identify a group of consumers with certain preferences or who are associated with certain group attributes and provide a pricing discount on certain goods or services. Promotions could also be enhanced. For example, upon a consumer entering the merchant's establishment with the payment device 12 of the present invention and being identified as a member of a particular group, the incentive manager 14B of the payment terminal 14 can determine that the consumer qualifies for certain products and provide discounted pricing to the consumer if the item is purchased. Accordingly, merchant marketing and sales of products and services can be enhanced utilizing the present invention.

Figure 4:
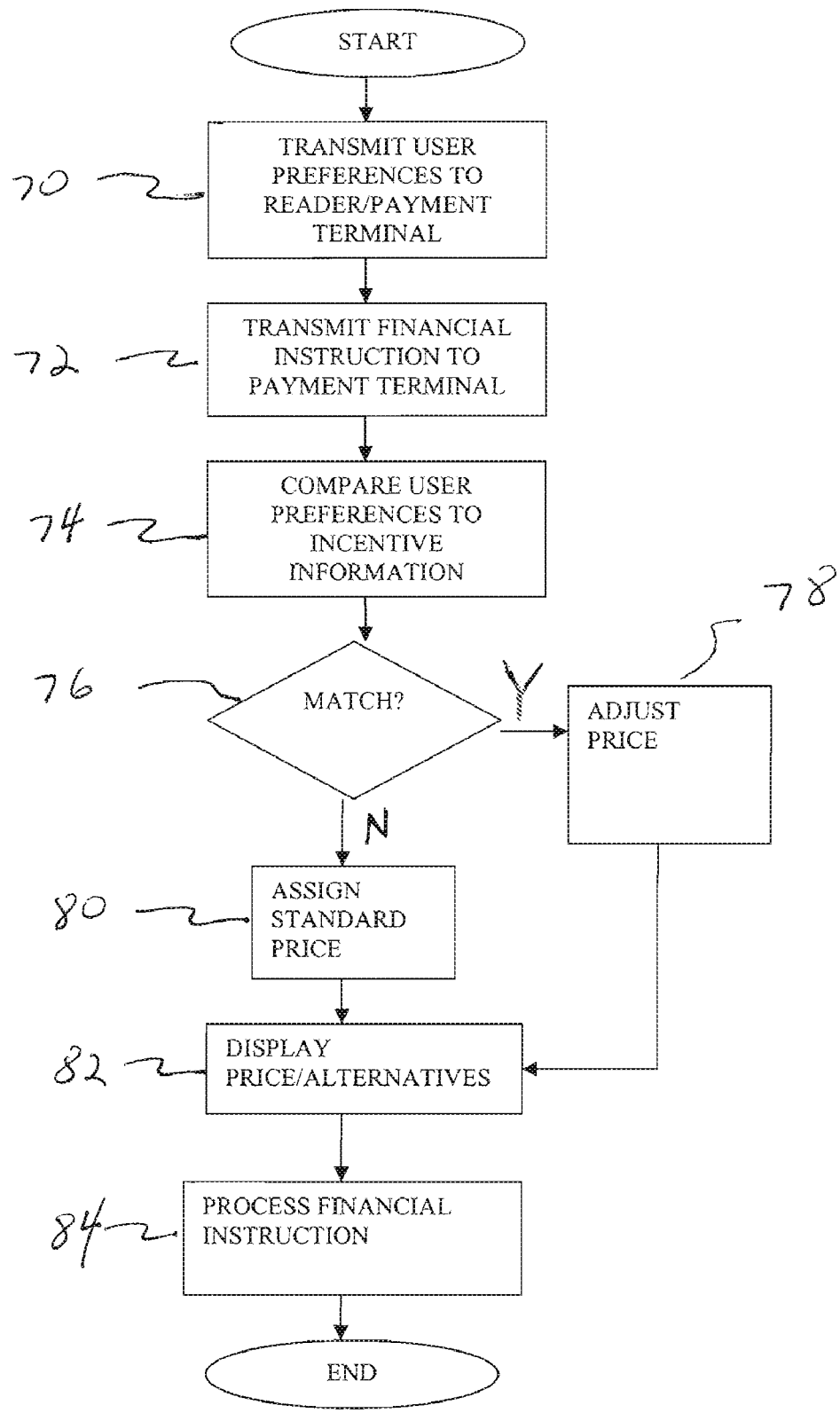
FIG. 4 is a flow chart of a method for customized pricing.

Turning now to FIG. 4, a typical financial transaction using the techniques of the present invention will now be described. As shown in the FIG. 4 example, first, the preference module 25 of the payment device 12 initiates a message transfer of user preferences 70. In one preferred embodiment, user preference information and prior purchases are transmitted to the reader 15 upon entrance into a merchant establishment, which in turn transmits the information to the payment terminal 14. In another preferred embodiment, the user preference and prior purchase information is transmitted through the reader 15 which is coupled to the payment terminal 14.

Once the payment device 12 transmits user preference and purchase information, the user of the payment device 12 can send financial transactions 72. For example, in one preferred embodiment, when the user of the payment device 12 desires to purchase goods or services from a merchant, the payment device 12 communicates a financial transaction instruction to the payment terminal 14.

Next, upon receiving the user preferences, the incentive manager 14B of the payment terminal 14 searches the incentive database 14C to determine whether any goods or services offered by the merchant match user preferences and/or prior purchases 74. For example, in one preferred embodiment, the incentive database 14C includes a profile of inventory attributes and associated prices that are searchable. The incentive manager 14B compares the received user preferences with the inventory attributes to determine whether or not there is a match. If there is a match 76, the incentive manager 14B applies the price value associated with the inventory attribute to the good or service being purchased and adjusts the financial transaction price accordingly 78.

In another preferred embodiment, the incentive manager 14B compares the prior purchases made with the payment device 12 to price discounted goods or services available for sale and adjusts the financial transaction price accordingly. Otherwise, as shown in FIG. 4, the incentive manager 14b does not modify the financial transaction price 80.

Next, the incentive manager 14B displays the financial transaction price (i.e., unmodified or adjusted) to the device user 82. In one preferred embodiment where the payment device is a smart card, the incentive manager 14B displays the financial transaction price and an indication of whether any discount pricing has been applied on a display device of the payment terminal. In another preferred embodiment, where the payment device includes a display terminal, the incentive manager 14B displays the price and any indication of price adjustment back to the payment device.

In one preferred embodiment, where there is not an exact match between inventory attributes and user preferences but some similarities, the incentive manager 14A of the present invention displays alternative products or services to the user on a display device for purchase consideration.

Once the incentive manager 14b determines whether any pricing discounts are applicable, the control module 14A processes the financial instruction 84 by sending an authorization request to the financial institution 16. The financial institution 16 then forwards the authorization request through the payment network 18 to the credit grantor 20.

Based upon the payment device user's account status and the amount of transaction, the credit grantor 20 authorizes or denies the authorization request. The grantor's 20 response is routed through the payment network 18 and the financial institution 18 to the payment terminal 16 and payment device 12. Accordingly, if the authorization request is granted, the purchase is recorded in the preference datastore 26 of the payment device 12 by the preference module 25.

A number of embodiments of the invention have been described. Nevertheless, it will be understood that various modifications may be made without departing from the spirit and scope of the invention. For example, payment terminals can provide messages to payment devices that could include information relating to upcoming offers and sales. Also, the steps described above may be modified in various ways or performed in a different order than described above, where appropriate. Accordingly, alternative embodiments are within the scope of the following claims.

What is claimed is:

1. A system for conducting a financial transaction comprising:
    a payment device capable of (i) receiving at least one user-selected personal preference selected by a user via a graphical use interface, said at least one user-selected personal preference including at least one of demographic and lifestyle information, (ii) storing said at least one user-selected personal preference, and (iii) sending said at least one user-selected personal preference, and a financial transaction instruction for purchasing at least one of a good and service; and a payment terminal capable of (i) receiving said at least one user-selected personal preference and said financial transaction instruction, (ii) processing said financial transaction instruction using said at least one user-selected personal preference, and (iii) adjusting pricing of goods and services automatically during the financial transaction based on comparing said at least one user-selected personal preference and at least one incentive item stored on the payment terminal, said at least one incentive item including a merchant discount, a merchant preference, and a merchant promotional offer.

2. The system of claim 1, wherein said at least one user-selected personal preference is protected using a secure protocol.

3. The system of claim 1 wherein said adjusted pricing of goods and services is displayed on a display device of at least one of said payment terminal and said payment device.

4. The system of claim 1, wherein said payment device stores a profile of said at least one good or service purchased.

5. The system of claim 4, wherein said payment device transmits said profile to said payment terminal and said payment terminal adjusts a purchase price for said at least one good and service based on said profile.

6. The system of claim 1, wherein said at least one user-selected personal preference and said financial transaction instruction are transmitted wirelessly to said payment terminal.

7. The system of claim 6, further comprising said payment device transmitting wirelessly a profile to said payment terminal and said payment terminal adjusting a purchase price for said at least one good and service based on at least one of said profile and said personal preference.

8. A method for conducting a financial transaction comprising:
providing a graphical user interface capable of allowing selection of at least one user-selected personal preference which includes at least one of demographic and lifestyle information;
providing a payment device capable of (i) receiving said at least one user-selected personal preference, (ii) storing said at least one user-selected personal preference, and (iii) sending said at least one user-selected personal preference and a financial transaction instruction for purchasing at least one of a good and service; and
providing a payment terminal capable of (i) receiving said at least one user-selected personal preference and said financial transaction instruction, (ii) processing said financial transaction instruction using said at least one user-selected personal preference, and (iii) adjusting pricing of goods and services automatically during the financial transaction based on comparing said at least one user-selected personal preference and at least one incentive item stored on the payment terminal, said at least one incentive item including a merchant discount, a merchant preference, and a merchant promotional offer.

9. The method of claim 8, comprising protecting said at least one user-selected personal preference using a secure protocol.

10. The method of claim 8, comprising displaying said adjusted pricing of goods and services on a display device of at least one of said payment terminal and said payment device.

11. The method of claim 8, comprising storing a profile of said at least one good or service purchased on said payment device.

12. The method of claim 11, further comprising:
transmitting said profile to said payment terminal; and
adjusting a purchase price for said at least one good and service based on said profile.

13. The method of claim 8, comprising transmitting wirelessly said at least one user-selected personal preference and said financial transaction instruction from said payment device to said payment terminal.

\* \* \* \* \*